(12) United States Patent
Svraka et al.

(10) Patent No.: US 11,952,932 B2
(45) Date of Patent: Apr. 9, 2024

(54) METHOD FOR CONTROLLING AN EXHAUST FLOW IN AN EXHAUST AFTERTREATMENT SYSTEM (EATS) OF A VEHICLE (71) Applicant: VOLVO TRUCK CORPORATION, Gothenburg (SE)

(72) Inventors: Irman Svraka, Tranås (SE); Åsa Högström, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 0 days.

(21) Appl. No.: 18/096,075

(22) Filed: Jan. 12, 2023

(65) Prior Publication Data
US 2023/0228206 A1 Jul. 20, 2023

(30) Foreign Application Priority Data
Jan. 17, 2022 (EP) .................................. 22151834

(51) Int. Cl.
*F01N 3/20* (2006.01)
*F01N 3/08* (2006.01)
(Continued)

(52) U.S. Cl.
CPC ............. *F01N 3/208* (2013.01); *F01N 3/106* (2013.01); *F01N 13/009* (2014.06);
(Continued)

(58) Field of Classification Search
CPC combination set(s) only.
See application file for complete search history.

(56) References Cited

U.S. PATENT DOCUMENTS 5,406,790 A * 4/1995 Hirota ................... F01N 13/011
60/276
10,641,153 B1 * 5/2020 Harris ................. F01N 13/0097
(Continued)

FOREIGN PATENT DOCUMENTS

DE 4310962 C1 2/1994
EP 0234817 A2 9/1987
(Continued)

OTHER PUBLICATIONS

European Search Report for European Patent Application No. 22151834.3, dated Jun. 29, 2022, 8 pages.

*Primary Examiner* — Binh Q Tran
(74) *Attorney, Agent, or Firm* — Sage Patent Group (57) ABSTRACT

A method for controlling exhaust flow in an EATS of a vehicle. A $NO_x$ sensor output parameter is monitored. It is determined that the $NO_x$ sensor output parameter is below a limit. When the $NO_x$ sensor output parameter is below the limit, it is determined that a first part of the exhaust flow should bypass at least a first area of the SCR unit and that a second part of the exhaust flow should be inputted to at least the first area of the SCR unit. It is initiated that the first part is bypassed and that the second part is inputted to at
(Continued)

least the first area of the SCR unit. An amount of reductant that should be added to the second part of the exhaust flow is determined. Addition of the amount of reductant is initiated.

15 Claims, 4 Drawing Sheets (51) Int. Cl.
*F01N 3/10* (2006.01)
*F01N 13/00* (2010.01)
*F01N 13/08* (2010.01)

(52) U.S. Cl.
CPC ............ *F01N 3/0878* (2013.01); *F01N 3/206* (2013.01); *F01N 3/2066* (2013.01); *F01N 13/087* (2013.01); *F01N 2410/02* (2013.01); *F01N 2410/03* (2013.01); *F01N 2410/10* (2013.01); *F01N 2410/12* (2013.01); *F01N 2550/06* (2013.01); *F01N 2550/10* (2013.01); *F01N 2560/026* (2013.01); *F01N 2560/07* (2013.01); *F01N 2570/14* (2013.01); *F01N 2610/02* (2013.01); *F01N 2610/14* (2013.01); *F01N 2900/14* (2013.01); *F01N 2900/1411* (2013.01); *F01N 2900/1616* (2013.01); *F01N 2900/1626* (2013.01)

(56) References Cited

U.S. PATENT DOCUMENTS

| 10,823,031 | B2 | 11/2020 | Rohde et al. | |
|---|---|---|---|---|
| 2009/0031711 | A1* | 2/2009 | Braun | F01N 3/035 60/297 |
| 2010/0005786 | A1* | 1/2010 | Hinz | F01N 3/0842 60/297 |
| 2013/0074474 | A1* | 3/2013 | Gonze | F01N 3/208 60/274 |
| 2014/0010744 | A1* | 1/2014 | Ruona | F01N 3/208 422/105 |
| 2017/0350295 | A1* | 12/2017 | Ueda | F01N 3/101 |
| 2019/0376429 | A1* | 12/2019 | Burge | F01N 3/2053 |
| 2020/0165950 | A1 | 5/2020 | Thomas et al. | |

FOREIGN PATENT DOCUMENTS

| EP | 3670855 A1 | 6/2020 |
|---|---|---|
| EP | 3670856 A1 | 6/2020 |

* cited by examiner

METHOD FOR CONTROLLING AN EXHAUST FLOW IN AN EXHAUST AFTERTREATMENT SYSTEM (EATS) OF A VEHICLE

CROSS REFERENCE TO RELATED APPLICATION

This application claims foreign priority to European Application No. 22151834.3, filed on Jan. 17, 2022, the disclosure and content of which is incorporated by reference herein in its entirety.

TECHNICAL FIELD

The present disclosure relates generally to a method, a control unit, an EATS, a computer program and a computer readable medium. More particularly the present disclosure relates to controlling exhaust flow in an EATS of a vehicle.

The disclosure can be applied in heavy-duty vehicles, such as trucks, buses and construction equipment etc. Although the disclosure will be described with respect to a truck, the disclosure is not restricted to this particular vehicle, but may also be used in other vehicles such as buses, trailers, wheel loaders, articulated haulers, excavators, back-hoe loaders, passenger cars, marine vessels, in various industrial construction machines or working machines etc. It is applicable in vehicles driven only by a combustion engine, as well as hybrid vehicles comprising both a combustion engine and an electric motor. The term vehicle will be used herein when referring to any of the above vehicle examples.

BACKGROUND

There is ongoing development and improvements in the vehicle industry to comply with legislations for emissions from vehicles and engines. One aspect of the legislation for emissions relates to the allowable amount of $NO_x$ in the output exhaust flow from a vehicle or engine. $NO_x$ is short for nitrogen oxide and is produced when fuel is combusted in a combustion engine in the presence of air. $NO_x$ comprises Nitric Oxide (NO) and Nitrogen Dioxide ($NO_2$). $NO_x$ can cause damage to humans and the environment, which is a reason for reducing the amount of $NO_x$ in the exhaust flow from vehicles.

Selective catalytic reduction (SCR) is a commonly used exhaust after-treatment technology for reducing the level of $NO_x$ in the exhaust flow. For this purpose, vehicles often have an SCR unit. The SCR unit may be referred to as an SCR catalyst. The SCR unit involves reductant being injected into the exhaust flow which at the end leads to a conversion of $NO_x$ into nitrogen ($N_2$) and water ($H_2O$), which do not cause damage to humans and the environment. The reductant being injected into the exhaust flow may be for example urea, ammonia ($NH_3$), Diesel Exhaust Fluid (DEF) etc. Ammonia is released when the reductant is injected into the exhaust flow and may be stored in the SCR unit. This may be described as the SCR unit comprises a $NH_3$ buffer, i.e. the SCR unit comprises an amount of $NH_3$ originating from the injected reductant. $NH_3$ is a catalyst for the reaction that converts the $NO_x$ into nitrogen and water.

A $NO_x$ sensor is commonly used for measuring the amount of $NO_x$ in the exhaust flow outputted from the vehicle. This $NO_x$ sensor is typically located after the SCR unit. An additional $NO_x$ sensor typically located before the SCR unit is used for example for determining the amount of reductant to be injected into the exhaust flow.

In general, it is a desire to improve control of the exhaust flow from vehicles and engines such that the emissions are as low as possible. This is important for example from both a health and an environmental point of view. This may be done by controlling the maximum amount of engine out $NO_x$ and by injecting a reductant into the exhaust flow. Injecting reductant in the exhaust flow involves an increased cost in the vehicle operation and may give rise to challenges in fulfilling fuel consumption legislation. Furthermore, if the assumed amount of $NH_3$ in the SCR unit is too high and there is a risk for $NH_3$ slip or creation of $N_{20}$ in an ASC unit, then this risk needs to be minimized by lowering or stopping the injection of reductant.

It is therefore not desirable to inject too much reductant into the system. As the combustion engine generates $NO_x$ when it is running, the $NH_3$ buffer is used to convert the $NO_x$ from the running engine when the currently injected amount of reductant is not sufficient. If the $NH_3$ buffer is used to a large extent, it may be emptied. Emptying the $NH_3$ buffer is however undesired due to the risk of later having high $NO_x$ incoming to the SCR unit. If the $NH_3$ buffer is empty and a large amount of $NO_x$ enter the system, it may not be possible to inject enough reductant to convert all $NO_x$ or reinstate the $NH_3$ buffer. Hence, some or all $NO_x$ may in such a situation pass through the system. This leads to a non-robust system and is of course undesired.

Furthermore, in case of low operating temperatures and an empty $NH_3$ buffer, more reductant cannot be injected. This also leads to a non-robust system, even in a scenario when the incoming amount $NO_x$ is not very high because it is not possible to convert any $NO_x$ at all.

There is a need to at least mitigate or solve this issue and improve the control of the amount of reductant injected into the exhaust flow and the control of the $NH_3$ buffer in the SCR unit.

SUMMARY

An object of the disclosure is to provide an improved control of the exhaust flow in an EATS of a vehicle.

According to a first aspect of the disclosure, the object is achieved by a method for controlling an exhaust flow in an EATS of a vehicle according to claim 1. The EATS comprises a $NO_x$ sensor and an SCR unit. A $NO_x$ sensor output parameter from the $NO_x$ sensor is monitored. Then it is determined if the $NO_x$ sensor output parameter is below a limit. When it has been determined that the $NO_x$ sensor output parameter is below the limit, it is determined that a first part of the exhaust flow should bypass at least a first area of the SCR unit and that a second part of the exhaust flow should be inputted to at least the first area of the SCR unit. The first part of the exhaust flow is initiated to bypass at least the first area of the SCR unit and the second part of the exhaust flow is initiated to be inputted to at least the first area of the SCR unit. When it has been determined that a first part of the exhaust flow should bypass at least a first area of the SCR unit and that a second part of the exhaust flow should be inputted to at least the first area of the SCR unit, it is determined that reductant should be added to the second part of the exhaust flow before being inputted to at least the first area of the SCR unit. The addition of the reductant into the second part is initiated. By the provision of a method where the first part of the exhaust flow is initiated to bypass at least the first area of the SCR unit, the advantage of improved control of the exhaust flow is provided. Furthermore, the method provides the possibility to prevent lowering or emptying of the NH$_3$ buffer and it allows a closed loop control of the NO$_x$ emission values.

According to one embodiment, the first part and the second part of the exhaust flow may be rejoined after the first part has bypassed at least the first area of the SCR unit and after the second part has been outputted from at least the first area of the SCR unit. An advantage of this may be that it allows a closed loop control of the emission values that differs from e.g., 0 g/kWh but without emptying the NH$_3$ buffer.

According to a further embodiment, the first part and the second part of the exhaust flow may be rejoined at a location between the SCR unit and the NO$_x$ sensor and at a point upstream an Ammonia Slip Catalyst (ASC) unit, as seen in a flow direction of the exhaust flow. An advantage of this may be that it allows for depleting the ASC unit of NH$_3$. This may be desired to minimize the risk of NH$_3$ and N$_{20}$ emissions from the ASC unit caused by over injection of reductant or NH$_3$ slip.

According to a further embodiment, the method may comprise to control which amount of the exhaust flow that should correspond to the first part of exhaust flow, and which amount of the exhaust flow that should correspond to the second part of the exhaust flow. An advantage of this may be that it may provide flexibility with regards to the amounts of exhaust flow that corresponds to the first part of the exhaust flow and the second part of the exhaust flow.

According to another embodiment, the step of determining that a first part of the exhaust flow should bypass at least the first area of the SCR unit and that the second part of the exhaust flow should be inputted to at least the first area of the SCR unit is further based on an amount of NH$_3$ comprised in the SCR unit. An advantage of basing the decision on the amount of NH$_3$ comprised in the SCR unit, in addition to be based on the NO$_x$ sensor output parameter being below the limit, may provide increased reliability of the decision.

According to a further embodiment, no reductant may be added to the first part of the exhaust flow. An advantage of this may be that, since reductant is only added to the second part of the exhaust flow and not to the first part, the total amount of reductant used in the EATS is reduced.

According to another embodiment, the first area may correspond to an area of the SCR unit comprising NH$_3$. Consequently, the first part of the exhaust flow may bypass the area of the SCR catalyst that comprises NH$_3$. Bypassing the area of the SCR catalyst that comprises NH$_3$ provides an advantage of improved control of the exhaust flow and does not lead to lowering or emptying the NH$_3$ buffer.

According to a second aspect of the disclosure, the object is achieved by a control unit for controlling exhaust flow in an EATS of a vehicle according to claim 8. The control unit is arranged to perform a method according to the first aspect. Advantages and effects of the control unit are largely analogous to the advantages and effects of the other aspects. Further, all embodiments of the control unit are applicable to and combinable with all embodiments of the other aspects, and vice versa.

According to a third aspect of the disclosure, the object is achieved by an EATS for a vehicle according to claim 9. The EATS comprises a NO$_x$ sensor arranged to provide a NO$_x$ sensor output parameter. The EATS comprises an SCR unit. The EATS comprises a bypass pipe arranged to convey a first part of the exhaust flow through the bypass pipe and thereby bypassing at least a first area of the SCR unit. The EATS comprises an exhaust pipe arranged to convey a second part of the exhaust flow through the exhaust pipe and thereby being inputted to at least the first area of the SCR unit. The EATS comprises a valve arranged to control the exhaust flow such that the first part of the exhaust flow is conveyed through the bypass pipe and the second part of the exhaust flow is conveyed through the exhaust pipe. The EATS comprises a reductant dosing device arranged to add a reductant to the second part of the exhaust flow before being inputted to at least the first area of the SCR catalyst. The EATS comprises a control unit according to the second aspect. Advantages and effects of the EATS are largely analogous to the advantages and effects of the other aspects. Further, all embodiments of the EATS are applicable to and combinable with all embodiments of the other aspects, and vice versa.

According to one embodiment, a first end of the bypass pipe may be connected to the exhaust pipe between a particulate filter and the SCR unit. A second end of the bypass pipe may be connected to the exhaust pipe between the SCR unit and a NO$_x$ sensor and at a point upstream an ASC unit, as seen in a flow direction of the exhaust flow. An advantage of this may be that it allows for depleting the ASC unit of NH$_3$. This may be desired to minimize the risk of NH$_3$ and N$_{20}$ emissions from the ASC unit caused by over injection of reductant or NH$_3$ slip.

According to a further embodiment, the control unit may be arranged to control the valve. An advantage of this may be that it may provide flexibility with regards to the amounts of exhaust flow that corresponds to the first part of the exhaust flow and the second part of the exhaust flow.

According to a fourth aspect of the disclosure, the object is achieved by a vehicle comprising a control unit according to the second aspect and/or an EATS according to the third aspect. Advantages and effects of the vehicle are largely analogous to the advantages and effects of the other aspects. Further, all embodiments of the vehicle are applicable to and combinable with all embodiments of the other aspects, and vice versa.

According to a fifth aspect of the disclosure, the object is achieved by a computer program according to claim 13. The computer program comprises program code means for performing the method of the first aspect when said program is run on a computer. Advantages and effects of the computer program are largely analogous to the advantages and effects of the other aspects. Further, all embodiments of the computer program are applicable to and combinable with all embodiments of the other aspects, and vice versa.

According to a sixth aspect of the disclosure, the object is achieved by a computer readable medium according to claim 14. The computer readable medium carries a computer program comprising program code means for performing the method of the first aspect when said program is run on a computer. Advantages and effects of the computer readable medium are largely analogous to the advantages and effects of the other aspects. Further, all embodiments of the computer readable medium are applicable to and combinable with all embodiments of the other aspects, and vice versa.

The embodiments herein are not limited to the features and advantages mentioned above. A person skilled in the art will recognize additional features and advantages upon reading the following detailed description.

BRIEF DESCRIPTION OF THE DRAWINGS

The embodiments herein will now be further described in more detail by way of example only in the following detailed description by reference to the appended drawings illustrating the embodiments and in which.

In the drawings.

The drawings are not necessarily to scale, and the dimensions of certain features may have been exaggerated for the sake of clarity. Emphasis is instead placed upon illustrating the principle of the embodiments herein.

DETAILED DESCRIPTION OF EXAMPLE EMBODIMENTS OF THE DISCLOSURE

Figure 1:
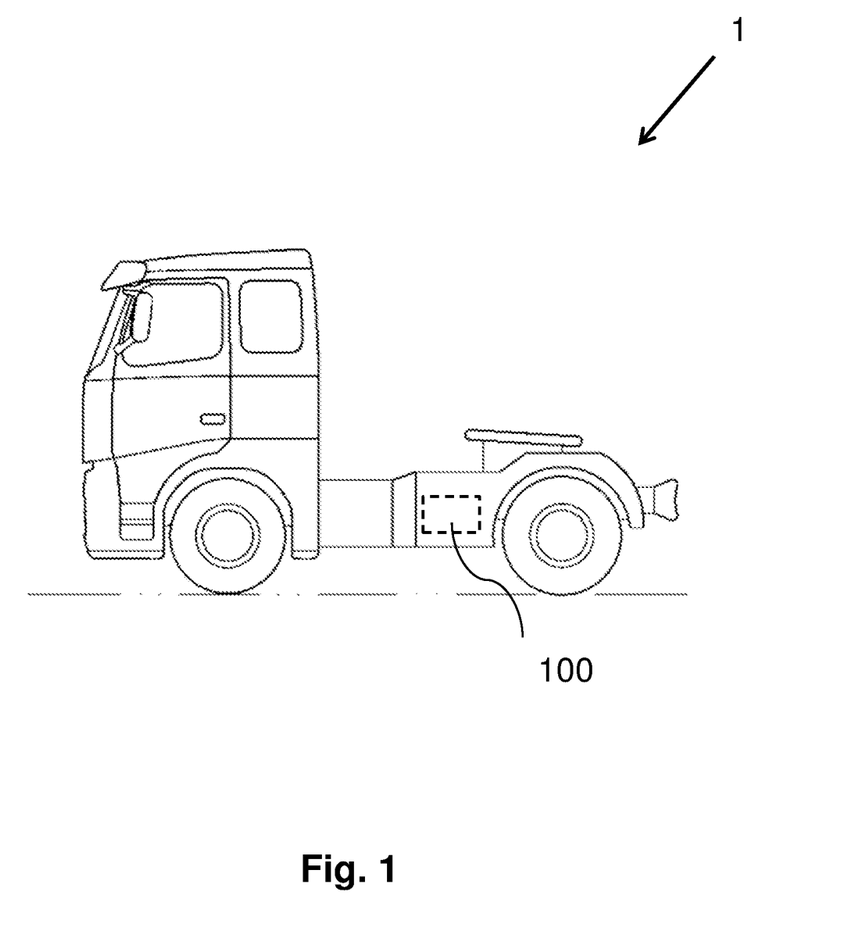
FIG. 1 is a schematic drawing illustrating a vehicle.

FIG. 1 is a schematic drawing illustrating a vehicle 1. The vehicle 1 may be a heavy-duty vehicle, such as a truck, bus or construction equipment, trailer, passenger car, marine vessel, etc. Some examples of a construction equipment may be wheel loader, articulated hauler, excavator, backhoe loader, etc. The vehicle 1 may be a hybrid vehicle comprising both an electric motor and a combustion engine, or the vehicle 1 may be a combustion engine vehicle comprising and being powered only by the combustion engine. The term vehicle will be used herein when referring to any of the above vehicle examples.

The vehicle 1 exemplified in FIG. 1 comprises an internal combustion engine (not shown) for propulsion of the vehicle 1, and an exhaust system including an EATS 100 for guiding and handling exhaust gases generated by the internal combustion engine.

Figure 2:
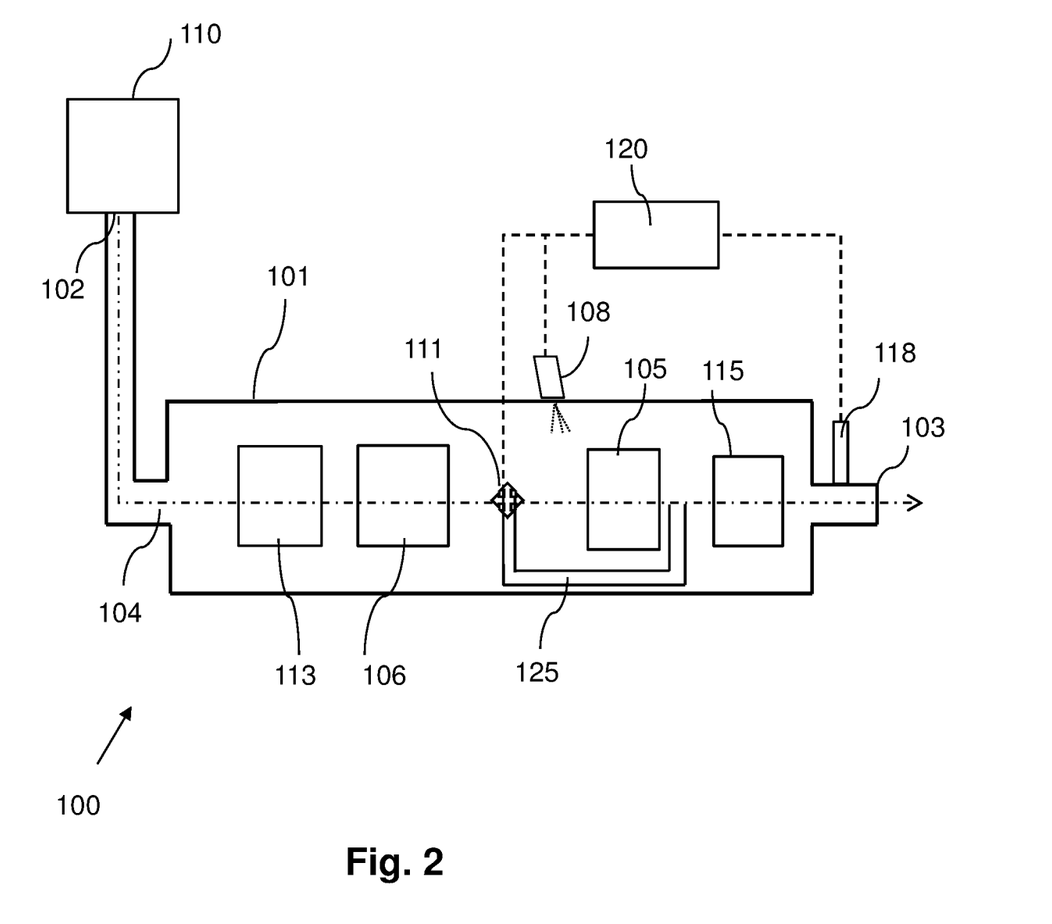
FIG. 2 is a schematic drawing illustrating an EATS.
Figure 3:
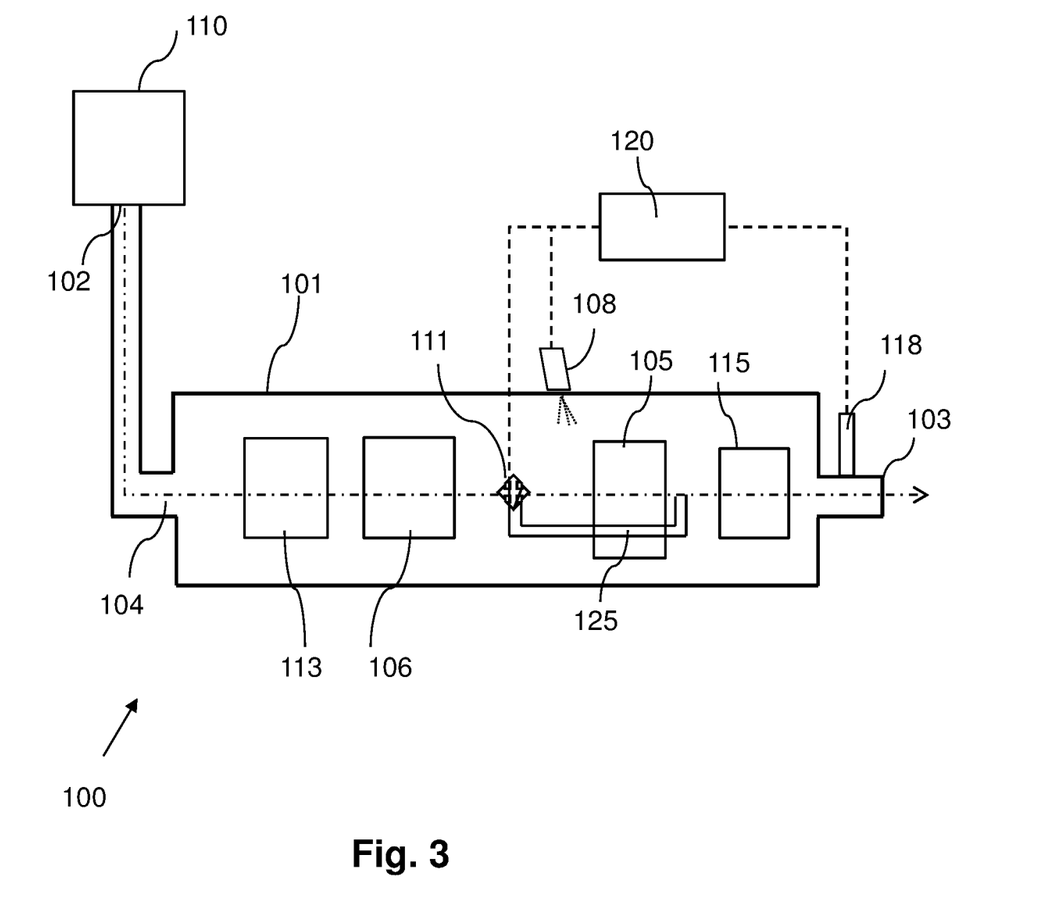
FIG. 3 is a schematic drawing illustrating an EATS.

FIG. 2 and FIG. 3 are schematic drawings illustrating the EATS 100 during operation of the vehicle 1. The difference between FIG. 2 and FIG. 3 will be described later. The EATS 100 is adapted to be installed in the vehicle 1.

An outer casing 101 delimits an exhaust flow path 104 of the exhaust system, extending from an engine 110, via an exhaust gas inlet 102 into the exhaust EATS 100, and out of the EATS 100 via an exhaust gas outlet 103. The EATS 100 exemplified in FIGS. 2 and 3 comprises at least four components 105, 106, 113, 115 for treatment of exhaust gases along the exhaust flow path 104. The components 105, 106, 113, 115 are an SCR unit 105, a particulate filter 106, such as a Diesel Particulate Filter (DPF), an oxidation catalyst unit 113, such as a Diesel Oxidation catalyst (DOC) unit, and an ASC unit 115. The ASC unit 115 is located furthest downstream, the SCR unit 105 is located upstream of the ASC unit 115, the particulate filter 106 is located upstream of the SCR unit 105, and the oxidation catalyst unit 113 is located upstream of the particulate filter 106.

Note that the engine 110 is not comprised in the EATS 100 but is illustrated in FIG. 2 and FIG. 3 for the sake of clarity. The engine 110 may be an internal combustion engine and may be diesel driven or driven by other suitable combustion fuel, such as e.g. hydrogen, Liquefied Natural Gas (LNG), Compressed Natural Gas (CNG) or petrol.

The EATS 100 further comprises a reductant dosing device 108 for adding a reductant to the exhaust flow upstream of the SCR unit 105. The reductant dosing device 108 is located between the particulate filter 106 and the SCR unit 105, so that the reductant is added and mixed with the exhaust gases immediately upstream of the SCR unit 105. The reductant dosing device 108 may be referred to as a reductant doser.

The amount of reductant added by the reductant dosing device 108 may be regulated to achieve a desired buffer of ammonia ($NH_3$) in the SCR unit 105. A buffer target level for $NH_3$ may be set and the amount of reductant to be added to achieve the buffer target level is set in dependence on exhaust mass flow from the engine 110 and the SCR unit temperature, in turn dependent on engine operating temperature. Models may be used to determine the amount of reductant to be dosed to achieve the buffer target level for the current operating conditions in terms of SCR unit temperature and exhaust mass flow.

A valve 111 is further provided upstream of the SCR unit 105 which will be described in more detail later.

A $NO_x$ sensor 118 is located downstream of the ASC unit 115. The $NO_x$ sensor 118 is adapted to measure the $NO_x$ in the exhaust flow at the exhaust gas outlet 103. An output from the $NO_x$ sensor 118 may be referred to as a $NO_x$ sensor output parameter and indicates an amount of $NO_x$ in the exhaust flow at the exhaust gas outlet 103. In other words, it provides an indication of the quantity or quality of the $NO_x$ conversion in the EATS 100.

The EATS 100 further comprises a control unit 120 configured to be connected to the valve 111, the reductant dosing device 108 and the $NO_x$ sensor 118. The control unit is adapted to control the valve 111 and to control the reductant dosing device 108. The control unit 120 is adapted to obtain the $NO_x$ sensor output parameter. The dotted lines between the control unit 120 and the valve 111, the reductant dosing device 108 and the $NO_x$ sensor 118 indicates that the lines are communication lines and not exhaust flow pipes.

A bypass pipe 125 is arranged such that it bypasses at least a first area of the SCR unit 105.

When the engine 110 is running, $NO_x$ is created due to combustion of fuel. Exhaust flow comprising $NO_x$ from the running engine 110 is conveyed through the exhaust system and passes first through the oxidation catalyst unit 113. After having passed through the oxidation catalyst unit 113, the exhaust flow passes through the particulate filter 106 where particles are removed from the exhaust flow. The exhaust flow outputted from the particulate filter 106 may then be split in two parts such that a first part of the exhaust flow is conveyed through the bypass pipe 125 and a second part of the exhaust flow is conveyed through the exhaust pipe and inputted into at least a first area of the SCR unit 105.

The bypass pipe 125 is arranged such that it bypasses at least a first area of the SCR unit 105. Bypassing at least the first area means that the bypass pipe 125 may bypass only the first area of the SCR unit 105 or that it may bypass the whole SCR unit 105 including the first area. FIG. 2 illustrates that the bypass pipe 125 may bypass the whole SCR unit 105 including the first area. This is a difference as compared to FIG. 3 which illustrates that the bypass pipe 125 bypasses only the first area of the SCR unit 105, and not the whole SCR unit 105. FIG. 3 will be described in more detail below. As seen in FIG. 2, the first part of the exhaust flow that is conveyed through the bypass pipe 125 is led around the SCR unit 105. In other words, the first part of the exhaust flow does not pass through the SCR unit 105. The purpose of the SCR unit 105 is to remove $NO_x$ from the exhaust flow and this is done using $NH_3$ from reductant. $NO_x$ will not be removed from the first part of the exhaust flow since it is led around the SCR unit 105. This gives an improved possibility to control the amount of system out $NO_x$ as well as the reductant dosing. Hence, the system out $NO_x$ values may be adjusted without having to empty the amount of $NH_3$ comprised in the SCR unit 105.

The input end of the bypass pipe 125 is connected to the valve 111 and the output end of the bypass pipe 125 is connected to the exhaust pipe at a point between the SCR unit 105 and the $NO_x$ sensor 188, and at point upstream the ASC unit 115, as seen in a flow direction of the exhaust flow. In other words, the output end of the bypass pipe 125 may be connected between the SCR unit 105 and the ASC unit 115. The bypass pipe 125 may be referred to as an SCR blowby pipe.

As mentioned above, the bypass pipe 125 is arranged such that it bypasses at least a first area of the SCR unit 105. The first area may be an area that comprises $NH_3$, e.g. a $NH_3$ buffer. This may involve that the first area of the SCR unit 105 is bypassed or that the whole SCR unit 105, including the first area, is bypassed. Bypassing the whole SCR unit 105, including the first area, is illustrated in FIG. 2. An advantage of that the bypass pipe 125 completely bypasses the whole SCR unit 105 may be that the bypass pipe 125 is easy to access for example when inspection or repair is necessary.

Bypassing only the first area of the SCR unit 105 is illustrated in FIG. 3. As seen in FIG. 3, the bypass pipe 125 goes through the SCR unit 105 and bypasses a first area of the SCR unit 105. The first area is exemplified by the area being above the bypass pipe 125 in FIG. 3 but may instead be an area being below the bypass pipe 125 or an upstream area of the SCR unit. Thus, the bypass pipe 125 may go through the SCR unit 105 in an area that do not comprise $NH_3$, or in an area comprising less $NH_3$ than other areas, for example in the top or bottom area of the SCR unit 105, i.e., along the top edge or bottom edge of the SCR unit 105 or in a downstream portion of the SCR unit. Hence, the first area of the SCR unit 105 that is bypassed may be an area that comprises the majority of $NH_3$ in the SCR unit 105, i.e., the first area comprises a larger amount of $NH_3$ as compared to the second area of the SCR unit 105 which the bypass pipe 125 goes through. Thus, the bypass pipe 125 may go through a second area of the SCR unit 105 which comprises a small amount of $NH_3$.

As previously mentioned, the SCR unit 105 comprises an amount of $NH_3$ that is not necessarily evenly distributed through the whole SCR unit 105. For example, a first amount of the $NH_3$ may be comprised in the first area, and a second amount of the $NH_3$ may be comprised in a second area, for example in the upper part of the SCR unit 105, in the lower part of the SCR unit 105, along one edge of the SCR unit 105, in the back or downstream part of the SCR unit 105, etc. The first amount is larger than the second amount. Actually, it may be desirable to not have a large amount of $NH_3$ at the end of the SCR unit 105 because this may lead to $NH_3$ slip, and as a further consequence, to $NH_3/N_2O$ emissions from the ASC unit. The risk for this may be reduced by leading the $NO_x$ to the other part of the SCR unit 105 by means of the bypass pipe 125. Then, the high amount of $NH_3$ in the first part of the SCR unit 105 may be maintained, or used to some extent to convert the $NH_3$ in the part of the exhaust flow that is not bypassed and at the same time the amount in the second part of the SCR unit 105 is reduced, and thereby the risk for $NH_3$ slip is also reduced. A benefit of maintaining an amount of $NH_3$ in the first part is to maintain a certain conversion capacity for later exhaust when there is a limited capacity for reductant injections. Hence, the $NH_3$ buffer may be used to convert $NO_x$ at a more suitable or critical time.

Thus, the exhaust flow may be led through certain areas of the SCR unit 105 which is not buffered up with $NH_3$. An advantage of the bypass pipe 125 going through the SCR unit 105 may be that it provides a compact system.

Similar for both the embodiment in FIG. 2 and in FIG. 3 is that the second part of the exhaust flow is conveyed through the exhaust pipe, i.e. it is not conveyed through the bypass pipe 125. Reductant from a reductant tank is injected by the reductant dosing device 108 into the second part of the exhaust flow. The area in which the reductant is injected may be referred to as a reductant mixbox. When reductant is injected into the second part of the exhaust flow, the reductant turns into $NH_3$, $CO_2$ and $H_2O$. After reductant has been injected, the second part of the exhaust flow enters the SCR unit 105. The SCR unit 105 comprises substances which, together with the $NH_3$ from the reductant converts the $NO_x$ into $N_2$ and $H_2O$. Thus, most of the $NO_x$ is removed from second part of the exhaust flow in the SCR unit 105.

The valve 111 comprised in the exhaust pipe is arranged to control the passage of the exhaust flow through at least the first area of the SCR unit 105 and the bypass pipe 215. The valve 111 may be a binary valve which is either fully open or fully closed, or it may be a continuously variable valve. A continuously variable valve allows for higher control of the exhaust flow. The continuously variable valve may be percentage wise controlled. For example, the valve 111 may be set to allow 10% of the exhaust flow to pass through the bypass pipe 125, while 90% of the exhaust flow may pass through the first area of the SCR unit 105 converting the rest of the 90% of the $NO_x$. These other 90% also allow reductant dosing and $NH_3$ buffer up. The valve 111 may be connected to and controlled by the control unit 120.

The first part and the second part of the exhaust flow are rejoined after the first part has bypassed at least the first area of the SCR unit 105 and after the second part has been outputted from at least the first area of the SCR unit 105. The first part and the second part of the exhaust flow are rejoined at a location between the SCR unit 105 and the $NO_x$ sensor 118 and at a point upstream an ASC unit 115, as seen in a flow direction of the exhaust flow. At the rejoining location, the exhaust flow is conveyed into the ASC unit 115. In the ASC unit 115 any possible leftover of $NH_3$ is removed. For example, not all of the available $NH_3$ may be used in the SCR unit 105, e.g. due to reductant overdosing or some other reason, and then the leftover $NH_3$ is removed in the ASC unit 115. The ASC unit 115 converts the $NH_3$ to $N_2$ and $H_2O$.

The $NO_x$ sensor 118 is located at the exhaust pipe at a location after the ASC unit 115. The $NO_x$ sensor 118 measures the $NO_x$ in the exhaust flow being outputted from the ASC unit 115. An output from the $NO_x$ sensor 118 may be referred to as a $NO_x$ sensor output parameter and indicates an amount of $NO_x$ in the exhaust flow being outputted from the ASC unit 115. In other words, it provides an indication of the quantity or quality of the $NO_x$ conversion in the EATS 100. The $NO_x$ sensor output parameter is provided to the control unit 120.

Based on the decision that that the part of the exhaust flow should be conveyed through the bypass pipe 125, the control unit 120 determines that reductant should be injected in to the second part of the exhaust flow, i.e. the part of the exhaust flow that should be conveyed through the exhaust pipe and into at least the first area of the SCR unit 105. No reductant should be injected into the first part of the exhaust flow, i.e. that part of the exhaust flow that is conveyed through the bypass pipe 125. The amount of reductant that should be injected into the second part of the exhaust flow may be determined using any suitable method, for example based on output parameters from another $NO_x$ sensor (not shown in FIG. 2 and FIG. 3).

The control unit 120 uses the $NO_x$ sensor output parameters from the $NO_x$ sensor 118 to control of the valve 111, i.e. to determine which amount of the exhaust flow that should go through the bypass pipe 125 and which amount of the exhaust flow that should go through the exhaust pipe and into the SCR unit 105. Information about the amount of $NH_3$ comprised in the SCR unit 105 may also be inputted to the control unit 120 and used for determining which amount of the exhaust flow that should go through the bypass pipe 125 and which amount of the exhaust flow that should go through the exhaust pipe and into the SCR unit 105. Thus, the control unit 120 may use the $NO_x$ sensor output parameters alone, or together with the information about the amount of $NH_3$ when it determines which amount of the exhaust flow that should go through the bypass pipe 125 and which amount of the exhaust flow that should go through the exhaust pipe and into the SCR unit 105.

The control unit 120 may be an electronic control unit comprising processing circuitry for performing the method described herein. The control unit 120 may be a processor or a computer. The control unit 120 may comprise hardware and software. The control unit 120 may comprise a computer program comprising program code means for performing the method described herein when said program is run on a computer. The computer may be or may be comprised in the control unit 120. The control unit 120 may control the valve 111. A computer readable medium may carry a computer program comprising program code means for performing the method described herein when said program product is run on a computer.

Note that the components of the EATS 100 described above may have other functions in addition to the ones described above, but these will not be described herein for the sake of simplicity.

A method for controlling exhaust flow in an EATS 100 of a vehicle 1 will now be described with reference to the flowchart depicted in FIG. 4. The EATS 100 comprises the $NO_x$ sensor 118 and the SCR unit 105. The steps may be performed by the control unit 120. The method comprises at least one of the following steps, which steps may as well be carried out in another suitable order than described below:

Step 401

In step 401, a $NO_x$ sensor output parameter from the $NO_x$ sensor 118 is monitored.

This step may comprise that the control unit 120 obtains the $NO_x$ sensor output parameter from the $NO_x$ sensor 118. The $NO_x$ sensor output parameter may be obtained by directly receiving it from the $NO_x$ sensor 118. The $NO_x$ sensor output parameter may be obtained in real time from the $NO_x$ sensor 118, it may be obtained upon request from the control unit 120, it may be obtained at a predetermined time, it may be obtained in predetermined time intervals etc. The control unit 120 may store the $NO_x$ sensor output parameter when it has been obtained, e.g. in a local memory comprised in the control unit 120, in a central memory in the vehicle 1, in a cloud memory or in any other suitable memory storage accessible by the control unit 120.

Step 402

In step 402, it is determined that the $NO_x$ sensor output parameter is below a limit.

In other words, the monitoring of the $NO_x$ sensor output parameter may indicate that the $NO_x$ sensor output parameter is below a limit. The limit may be a predetermined limit, for example as defined in legislations. The limit may be for example that the $NO_x$ sensor output parameter should not be above 0.21 g/kWh, i.e. the max amount of $NO_x$ system out allowed is 0.21 g/kW. Note that 0.21 g/kWh is only an example and that any other suitable number may be applicable.

Step 403

In step 403, when it has been determined that the $NO_x$ sensor output parameter is below the limit, it is determined that a first part of the exhaust flow should bypass at least a first area of the SCR unit 105 and that a second part of the exhaust flow should be inputted to at least the first area of the SCR unit 105.

For example, if the $NO_x$ sensor output parameter is below the limit of e.g., 0.21 g/kWh, then it is determined that a first part of the exhaust flow should bypass at least a first area of the SCR unit 105 and that a second part of the exhaust flow should be inputted to at least the first area of the SCR unit 105. The $NO_x$ sensor output parameter being below the limit is the trigger for using the bypass pipe 125. The $NO_x$ sensor output parameter may be directly compared with the limit, or it may be processed in any suitable way before being compared with the limit.

The first part and the second part of the exhaust flow may be rejoined after the first part has bypassed at least the first area of the SCR unit 105 and after the second part has been outputted from at least the first area of the SCR unit 105.

The first part and the second part of the exhaust flow may be rejoined at a location between the SCR unit 105 and the $NO_x$ sensor 118 and at a point upstream an ASC unit 115, as seen in a flow direction of the exhaust flow.

The determining in step 403 may be further based on an amount of $NH_3$ comprised in the SCR unit 105. In some examples, the control unit 120 comprises or may obtain information about the amount of $NH_3$ comprised in the SCR unit 105. If the assumed amount of $NH_3$ is too high and there is a risk for $NH_3$ slip or creation of $N_{20}$ in the ASC unit 115, then the risk for this may be minimized by leading a first part of the exhaust flow through the bypass pipe 125. At the same time, a high $NH_3$ buffer in the SCR unit 105 may be maintained.

The first area may correspond to an area of the SCR unit 105 comprising $NH_3$. The amount $NH_3$ stored in that area may be called a $NH_3$ buffer or $NH_3$ storage.

Step 404

In step 404, which amount of the exhaust flow that should correspond to the first part of exhaust flow, and which amount of the exhaust flow that should correspond to the second part of the exhaust flow may be controlled, e.g. controlled by the control unit 120.

Using other words, the control unit 120 may control which amount of the exhaust flow that should correspond to the first part of exhaust flow, and which amount of the exhaust flow that should correspond to the second part of the exhaust flow.

For example, it may be determined that 10% of the exhaust flow should correspond to the first part of the exhaust flow and that 90% of the exhaust flow should correspond to the second part of the exhaust flow, or that 90% of the exhaust flow should correspond to the first part of the exhaust flow and that 10% of the exhaust flow should correspond to the second part of the exhaust flow. Note that these are only examples and that any suitable percentage may be applicable.

The determining of the amounts may be based on the $NO_x$ sensor output parameter.

Step 405

In step 405, it is initiated that the first part of the exhaust flow is bypassed at least the first area of the SCR unit 105 and that the second part of the exhaust flow is inputted to at least the first area of the SCR unit 105.

This step may comprise that the control unit 120 sends instructions to the valve 111 to control the exhaust flow such that a first part of the exhaust flow is conveyed through the bypass pipe 125 and such that the second part of the exhaust flow is conveyed through the exhaust pipe and enters at least the first area of the SCR catalyst 105.

Step 406

In step 406, when it has been determined that a first part of the exhaust flow should bypass at least a first area of the SCR unit 105 and that a second part of the exhaust flow should be inputted to at least the first area of the SCR unit 105 it is further determined that reductant should be added to the second part of the exhaust flow before being inputted to at least the first area of the SCR unit 105. No reductant may be added to the first part of the exhaust flow.

The amount of reductant may be determined by the control unit 120 or by some other unit. The amount of reductant may be determined based on an output parameter from another $NO_x$ sensor in the EATS 100 which is different from the $NO_x$ sensor 118 seen in FIGS. 2 and 3.

Step 407

In step 407, addition of the reductant into the second part of the exhaust flow is initiated.

This step may comprise that the control unit 120 sends instructions to the reductant dosing device 108 to inject the reductant into the second part of the exhaust flow. The reductant dosing device 108 acts according to the received instructions.

Figure 4:
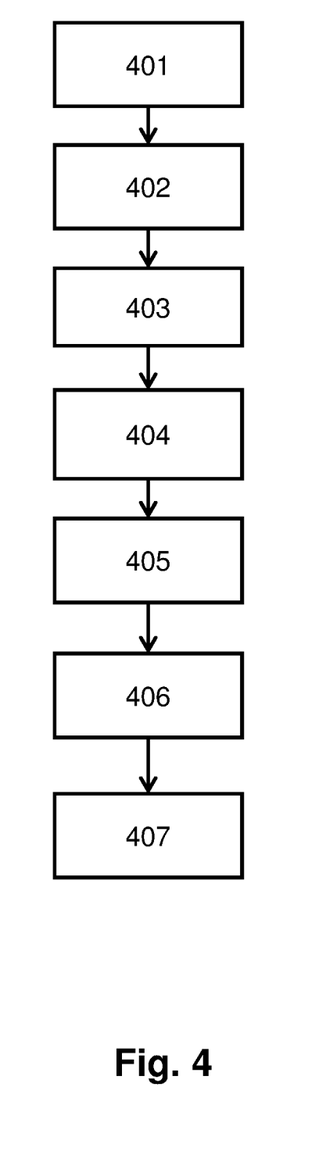
FIG. 4 is a flow chart illustrating a method.

The control unit 120 for controlling exhaust flow in the EATS 100 of a vehicle 1 is arranged to, e.g. by means of a processor, perform the method according to at least one of the steps in FIG. 4 described above.

The EATS 100 for controlling exhaust flow in a vehicle 1 comprises a $NO_x$ sensor 118 arranged to provide a $NO_x$ sensor output parameter and an SCR unit 105. As mentioned above, $NH_3$ is generated when reductant has been injected into the exhaust flow. Thus, after the reductant has been injected and the exhaust flow has entered the SCR unit 105, the SCR unit 105 may be described as comprising $NH_3$. The $NH_3$ may be comprised as a $NH_3$ buffer stored in the SCR unit 105.

The EATS 100 comprises a bypass pipe 125 arranged to convey a first part of the exhaust flow through the bypass pipe 125 and thereby bypassing at least a first area of the SCR unit 105.

The EATS 100 comprises an exhaust pipe arranged to convey a second part of the exhaust flow through the exhaust pipe and thereby being inputted to at least the first area of the SCR unit 105. A first end of the bypass pipe 125 may be connected to the exhaust pipe between a particulate filter 106 and the SCR unit 105. A second end of the bypass pipe 125 may be connected to the exhaust pipe between the SCR unit 105 and a $NO_x$ sensor 118 and at a point upstream an ASC unit 115, as seen in a flow direction of the exhaust flow.

The EATS 100 comprises a valve 111 arranged to control the exhaust flow such that the first part of the exhaust flow is conveyed through the bypass pipe 125 and the second part of the exhaust flow is conveyed through the exhaust pipe. The valve 111 may be controlled by the control unit 120.

The EATS 100 comprises a reductant dosing device 108 arranged to add reductant to the second part of the exhaust flow before being inputted to at least the first area of the SCR unit 105.

The EATS 100 comprises the control unit 120 as described above. The control unit 120 may be arranged to control the valve 111.

The vehicle 1 comprises the control unit 120 and/or the EATS 100.

A computer program comprises program code means for performing at least one of the steps of the method in FIG. 4 when said program is run on a computer.

A computer readable medium carries a computer program comprising program code means for performing the at least one of the steps in the method of FIG. 4 when said program product is run on a computer.

As mentioned earlier, an issue with the known technology is that $NO_x$ cannot bypass the SCR unit 105 when there is enough $NH_3$ in the $NH_3$ buffer in the SCR unit 105 and high enough temperature without emptying the $NH_3$ buffer. Emptying the $NH_3$ buffer in the SCR unit 105 is however very dangerous due to the risk of having high $NO_x$ incoming to the SCR unit 105 at a later stage, leading to a very non robust system. If the $NH_3$ buffer is empty, all $NO_x$ will pass through in an uncontrolled amount, regardless of it is a high or low amount. This is avoided with the present disclosure by means of the bypass pipe 125.

With the present disclosure, the exhaust flow is led around the SCR unit 105 and returned to the exhaust pipe, e.g. the system out pipe. The return of the bypass pipe 125 to the exhaust pipe may be prior to the system out $NO_x$ sensor 118, allowing for a closed loop control of the emission values that differs from 0 g/kWh, but without emptying the $NH_3$ buffer comprised in the SCR unit 105. The bypass pipe 125 may connect to the exhaust pipe post SCR unit 105 and pre ASC unit 115. This may allow for depleting the ASC unit 115 of $NH_3$. This may be desired to minimize the risk of $NH_3$ and $N_{20}$ emissions from the ASC unit 115 caused by over injection of reductant or $NH_3$ slip.

The present disclosure relates to the field of EATS. The disclosure affects functionalities such as e.g. the SCR unit 105, reductant dosing and $NO_x$ system out values. The present disclosure also affects possibilities of actual emission value control compared to a conventional system.

An external pipe or hole, herein referred to as a bypass pipe 125, leads the exhaust flow around the SCR unit 105, leading to higher system out $NO_x$ values without lowering the $NH_3$ buffer comprised in the SCR unit 105. This alternative route for the exhaust flow may need some form of valve, e.g. a continuously variable one that allows for higher control. A control unit 120 is adapted to control the valve 111. The input to the control unit 120 may be the $NO_x$ sensor output parameter from the $NO_x$ sensor 118. These degrees of freedom allow to control when to allow part of the exhaust flow to surpass the SCR unit 105 whilst still allowing reductant dosing and does not decrease the $NH_3$ buffer in the SCR unit 105.

It is to be understood that the present disclosure is not limited to the embodiments described above and illustrated in the drawings; rather, the skilled person will recognize that many changes and modifications may be made within the scope of the appended claims.

The term "at least one of A and B" should be understood to mean "only A, only B, or both A and B.", where A and B are any parameter, number, indication used herein etc.

It should be emphasized that the term "comprises/comprising" when used in this specification is taken to specify the presence of stated features, integers, steps or components, but does not preclude the presence or addition of one or more other features, integers, steps, components or groups thereof. It should also be noted that the words "a" or "an" preceding an element do not exclude the presence of a plurality of such elements.

The term "configured to" used herein may also be referred to as "arranged to", "adapted to", "capable of" or "operative to".

It should also be emphasised that the steps of the methods defined in the appended claims may, without departing from the embodiments herein, be performed in another order than the order in which they appear in the claims.

The invention claimed is:

1. A method for controlling an exhaust flow in an Exhaust Aftertreatment System (EATS) of a vehicle, wherein the EATS comprises a $NO_x$ sensor and a Selective Catalytic Reduction (SCR) unit, the method comprising:
 monitoring a $NO_x$ sensor output parameter from the $NO_x$ sensor;
 determining if the $NO_x$ sensor output parameter is below a limit;
 when it has been determined that the $NO_x$ sensor output parameter is below the limit, determining that a first part of the exhaust flow should bypass at least a first area of the SCR unit and that a second part of the exhaust flow should be inputted to at least the first area of the SCR unit, wherein the first part and the second part are rejoined and wherein the NOx sensor is located at a point after the first part and the second part of the exhaust flow are rejoined;
 initiating that the first part of the exhaust flow is bypassed at least the first area of the SCR unit and that the second part of the exhaust flow is inputted to at least the first area of the SCR unit;
 when it has been determined that the first part of the exhaust flow should bypass at least the first area of the SCR unit and that the second part of the exhaust flow should be inputted to at least the first area of the SCR unit, determining that reductant should be added to the second part of the exhaust flow before being inputted to at least the first area of the SCR unit; and
 initiating addition of the reductant into the second part of the exhaust flow.

2. The method according to claim 1, wherein the first part and the second part of the exhaust flow are rejoined after the first part has bypassed at least the first area of the SCR unit and after the second part has been outputted from at least the first area of the SCR unit.

3. The method according to claim 2, wherein the first part and the second part of the exhaust flow are rejoined at a location between the SCR unit and the $NO_x$ sensor and at a point upstream an Ammonia Slip Catalyst (ASC) unit, as seen in a flow direction of the exhaust flow.

4. The method according to claim 1: comprising:
 controlling which amount of the exhaust flow that should correspond to the first part of exhaust flow and which amount of the exhaust flow that should correspond to the second part of the exhaust flow.

5. The method according to claim 1, wherein the determining that a first part of the exhaust flow should bypass at least the first area of the SCR unit and that the second part of the exhaust flow should be inputted to at least the first area of the SCR unit is further based on an amount of $NH_3$ comprised in the SCR unit.

6. The method according to claim 1, wherein no reductant is added to the first part of the exhaust flow.

7. The method according to claim 1, wherein the first area corresponds to an area of the SCR unit comprising $NH_3$.

8. A control unit for controlling exhaust flow in an Exhaust Aftertreatment System (EATS) of a vehicle, the control unit being arranged to perform a method according to claim 1.

9. An Exhaust Aftertreatment System for a vehicle, the EATS comprising:
 a $NO_x$ sensor arranged to provide a $NO_x$ sensor output parameter;
 a Selective Catalytic Reduction (SCR) unit;
 a bypass pipe arranged to convey a first part of the exhaust flow through the bypass pipe and thereby bypassing at least a first area of the SCR unit,
 an exhaust pipe arranged to convey a second part of the exhaust flow through the exhaust pipe and thereby being inputted to at least the first area of the SCR unit;
 a valve arranged to control the exhaust flow such that the first part of the exhaust flow is conveyed through the bypass pipe and the second part of the exhaust flow is conveyed through the exhaust pipe;
 a reductant dosing device arranged to add reductant to the second part of the exhaust flow before being inputted to at least the first area of the SCR unit; and
 a control unit according to claim 8.

10. The EATS according to claim 9,
 wherein a first end of the bypass pipe is connected to the exhaust pipe between a particulate filter and the SCR unit; and
 wherein a second end of the bypass pipe is connected to the exhaust pipe between the SCR unit and a $NO_x$ sensor and at a point upstream an Ammonia Slip Catalyst (ASC) unit, as seen in a flow direction of the exhaust flow.

11. The EATS according to claim 9, wherein the control unit is arranged to control the valve.

12. A vehicle comprising a control unit according to claim 8.

13. A computer program comprising program code for performing the method of claim 1 when said program is run on a computer.

14. A computer readable medium carrying a computer program comprising program code for performing the method of claim 1 when said program product is run on a computer.

15. A vehicle comprising an Exhaust Aftertreatment System (EATS) according to claim 9.

* * * * *